(12) United States Patent
Wan

(10) Patent No.: US 11,815,035 B2
(45) Date of Patent: Nov. 14, 2023

(54) SOOT SENSOR ARRANGEMENT

(71) Applicant: DELPHI TECHNOLOGIES IP LIMITED, St. Michael (BB)

(72) Inventor: Kin Beng Wan, Singapore (SG)

(73) Assignee: Delphi Technologies IP Limited, St. Michael (BB)

( * ) Notice: Subject to any disclaimer, the term of this patent is extended or adjusted under 35 U.S.C. 154(b) by 340 days.

(21) Appl. No.: 17/292,496

(22) PCT Filed: Nov. 1, 2019

(86) PCT No.: PCT/EP2019/079961
§ 371 (c)(1),
(2) Date: May 10, 2021

(87) PCT Pub. No.: WO2020/099150
PCT Pub. Date: May 22, 2020

(65) Prior Publication Data
US 2022/0018300 A1 Jan. 20, 2022

(30) Foreign Application Priority Data

Nov. 15, 2018 (SG) .......................... 10201810190X

(51) Int. Cl.
*F02D 41/14* (2006.01)
*G01N 15/06* (2006.01)
(Continued)

(52) U.S. Cl.
CPC ..... *F02D 41/1466* (2013.01); *F02D 41/1494* (2013.01); *G01N 15/0656* (2013.01);
(Continued)

(58) Field of Classification Search
CPC ............ F02D 41/1466; F02D 41/1494; G01N 15/0656; G01N 27/045; G01N 15/0606
See application file for complete search history.

(56) References Cited

U.S. PATENT DOCUMENTS 9,605,578 B1 3/2017 Qi
2002/0164815 A1 11/2002 Walde
(Continued)

FOREIGN PATENT DOCUMENTS

CN 1945972 A 4/2007
CN 101241099 A 8/2008
(Continued)

OTHER PUBLICATIONS

Search Report of the Intellectual Property Office of Singapore in Application No. 10201810190X, dated Sep. 26, 2019, (2 pages).
(Continued)

*Primary Examiner* — David Z Huang
(74) *Attorney, Agent, or Firm* — Joshua M. Haines; Bookoff McAndrews, PLLC

(57) ABSTRACT

A particulate matter (PM) sensor circuit arrangement includes a PM sensor. The sensor includes, integral therewith, a PM sensor resistor, a resistive temperature device (RTD) resistor, and a heater resistor. The PM sensor includes four terminal pins, of which a) a first terminal pin is connected to one terminal of the PM sensor resistor; a second terminal pin is connected to one terminal side of said RTD resistor; c) a third terminal pin being connected to one terminal of a heater resistor; and d) a fourth common terminal pin is connected to respective opposite terminals of the PM sensor resistor, RTD resistor, and heater resistor to the first, second, and third terminal pins. The fourth common terminal pin is operationally connected to a boost or voltage supply and the first pin is connected to a low side line.

10 Claims, 5 Drawing Sheets

(51) Int. Cl.
*G01N 27/04* (2006.01)
*G01N 15/00* (2006.01)

(52) U.S. Cl.
CPC ........ *G01N 27/045* (2013.01); *F01N 2560/05* (2013.01); *F01N 2560/20* (2013.01); *G01N 2015/0046* (2013.01)

(56) References Cited

U.S. PATENT DOCUMENTS

| | | | |
|---|---|---|---|
| 2002/0179443 A1 | 12/2002 | Hada et al. | |
| 2008/0178657 A1 | 7/2008 | Komatsu et al. | |
| 2009/0301180 A1 | 12/2009 | Reutiman et al. | |
| 2011/0259079 A1* | 10/2011 | Maeda | G01N 15/0656 73/23.33 |
| 2015/0211429 A1* | 7/2015 | Hocken | F02D 41/029 324/601 |
| 2016/0103055 A1 | 4/2016 | Gaertner et al. | |
| 2017/0199111 A1 | 7/2017 | Baars et al. | |
| 2018/0195947 A1 | 7/2018 | Andoh | |
| 2018/0238821 A1 | 8/2018 | Otomaru et al. | |

FOREIGN PATENT DOCUMENTS

| | | |
|---|---|---|
| CN | 103026626 A | 4/2013 |
| CN | 207717584 U | 8/2018 |
| DE | 10201807733 A1 | 10/2018 |
| JP | 2017198564 A | 11/2017 |
| WO | 2011093315 A1 | 8/2011 |
| WO | 2012080336 A1 | 6/2012 |
| WO | WO 2017/002462 A1 | 1/2017 |

OTHER PUBLICATIONS

Written Opinion of the International Searching Authority in Application No. PCT/EP2019/079961, dated May 18, 2021, (10 pages).
Office Action for Chinese Patent Application No. 201980075129.X dated Sep. 5, 2022 (8 pages).
Reference listing from Notice of Allowance in CN application No. 201980075129.X, dated Jun. 20, 2023 (3 pages).

* cited by examiner

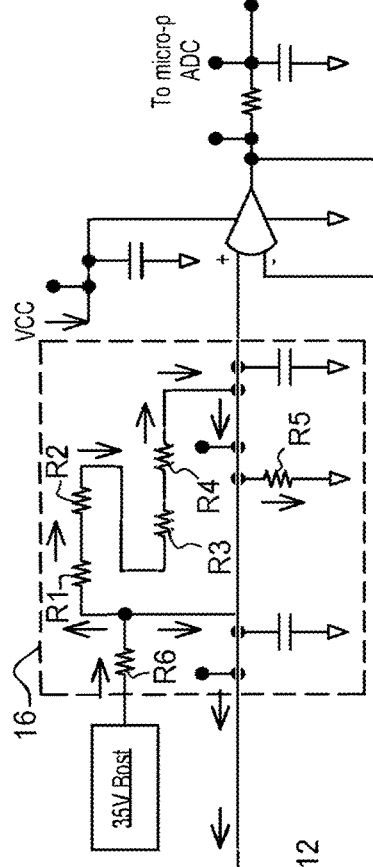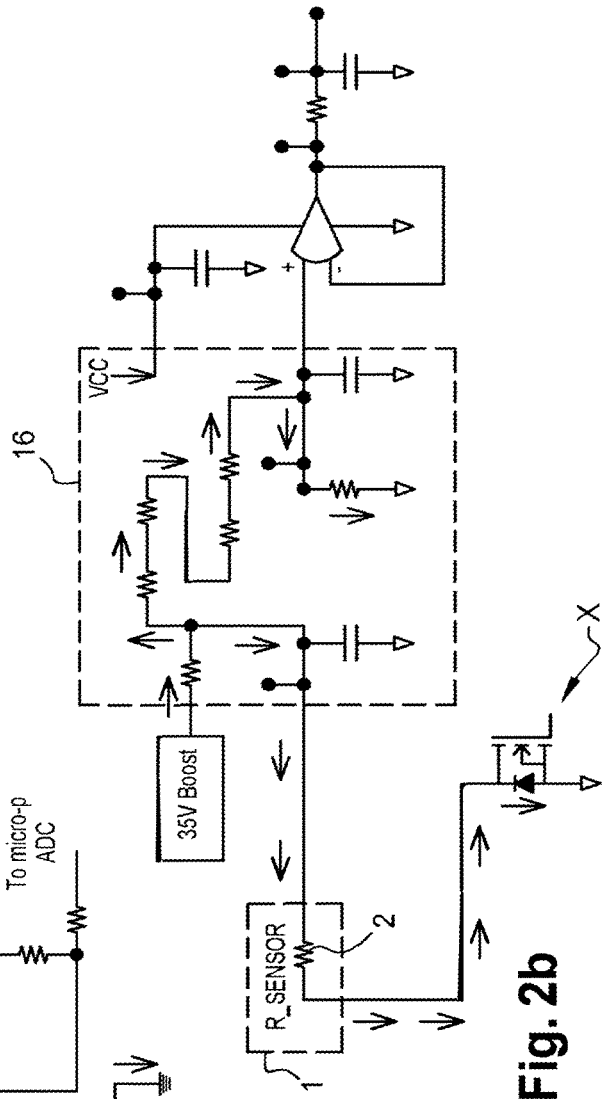

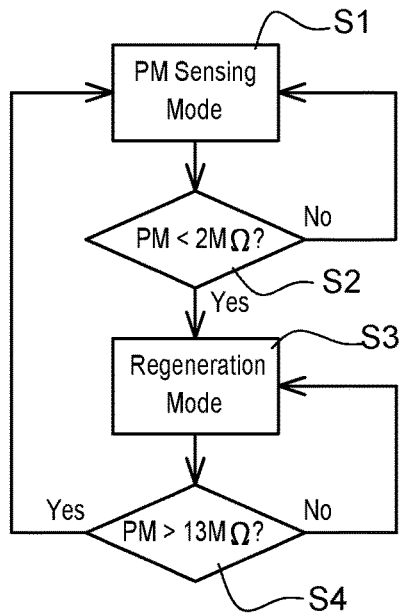
Fig. 5a
| Functions | PM Sensing Mode | Regeneration Mode |
|---|---|---|
| PM Sense | Enabled | Disabled |
| RTD | Disabled | Enabled |
| Heater | Disabled | Enabled |
Fig. 5b
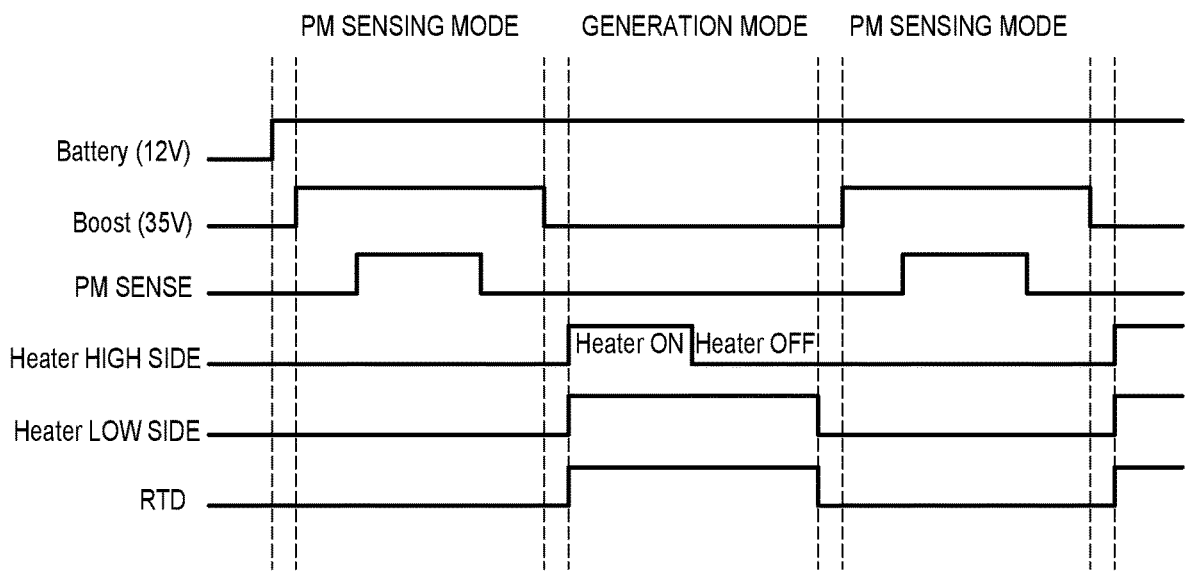
Fig. 6

SOOT SENSOR ARRANGEMENT

CROSS REFERENCE TO RELATED APPLICATIONS

This application is a national stage application under 35 USC 371 of PCT Application No. PCT/EP2019/079961 having an international filing date of Nov. 1, 2019, which is designated in the United States and which claimed the benefit of SG Patent Application No. 10201810190X filed on Nov. 15, 2018, the entire disclosures of each are hereby incorporated by reference in their entirety.

TECHNICAL FIELD

This invention relates to Particulate Matter (PM) Sensors which are typically used in automotive application to determine accumulated soot levels, and more particularly to the associated circuitry therefor.

BACKGROUND OF THE INVENTION

PM (Particulate Matter) Sensors are commonly used in Diesel vehicles for measurement of PM emissions in the exhaust system (after Diesel Particulate Filter). Typically, these devices comprise a sensor resistor where deposits of soot thereon change the resistivity of the sensor resistor, thus enabling the amount of accumulated soot to be determined; associated circuitry is used to measure changes in this resistivity. Such soot sensors also usually include a heating element/resistor which can be used to burn off soot in a regeneration cycle.

Thus such soot sensors thus use a 'Resistivity' method to measure the PM level accumulated on the sensor. Typically, a PM sensor has at least 4 terminals (pins out). These connect sub-components of the PM sensor such as the sensor resistor and the heating resistor.

To measure PM sensor resistance in the range from 1 M to 13 MΩ, multiple high impedance resistors are required in the associated (interface) circuitry. This incurs a high part cost due to multiple 0.1% resistors being used. The total cost is currently $0.26 for 6×0.1% resistors.

Furthermore, there is currently a high impedance measurement accuracy issue in such circuitry caused by solder flux residue. When operating at high ambient temperature (85-125° C.), the solder flux resistance will be greatly reduced and this can cause measurement error of >15%. To remove the solder flux residue, the PCBs need to be cleaned with special chemical and formula and the cost is very high—currently approximately $3 cleaning cost per board.

It is an object of the invention to reduce provide PM sensor circuit arrangement where the measurement error is reduced and which overcomes the aforementioned problems. It is a further object to remove the solder flux cleaning process from the existing production of PM controller. It is a further object to maintain the advantage of 4 pin PM sensor design compared to a 5 pin sensor design. The inventors have invented new circuitry which overcomes these problems and reduces the number of high impedance resistors.

SUMMARY OF THE INVENTION

In one aspect is provided A particulate matter (PM) sensor circuit arrangement including a PM sensor; said sensor including integral therewith: a PM sensor resistor; an RTD resistor and a heater resistor, said PM sensor including four terminal pins, of which:

a) a first terminal pin being connected to one terminal of said PM sensor resistor;
b) a second terminal pin being connected to one terminal side of said RTD resistor;
c) a third terminal pin being connected to one terminal of a heater resistor;
d) a fourth common terminal pin being connected to the respective opposite terminals of said PM, RTD and heater resistors to said first, second and third terminal pins; characterized wherein said fourth common pin is operationally connectable or connected to a boost or voltage supply, and where said first pin is connected to a low side line.

The arrangement may include a microprocessor connected to said PM sensor via intermediate circuitry.

The arrangement may include low side circuitry or a low side driver interface connected between a microprocessor and said first terminal pin.

Said third terminal pin may be connected to either a high side heater line/driver or a low side heater line/driver.

Said fourth common pin may be configured to be selectively operationally connected to said boost supply, or a heater high or low side heater driver/line.

Said third terminal may be is configured to be selectively operationally connected to a heater high side driver and said fourth terminal pin is configured to be selectively operationally connected to a low side heater line/driver or said boost voltage line.

The arrangement may include a diode located between said third terminal pin and said respective heater low or high side driver/line.

Said circuit arrangement may be selectable in a first mode to operationally connect said boost supply to said fourth terminal allow current to flow from said boost supply via said fourth terminal through said sensing resistor to said first terminal, and to operationally disconnect said heater low or high side driver from said fourth terminal so as to prevent current flowing through said heater resistor.

Said circuit arrangement may be selectable in a second mode to allow current to flow through said heater resistor via said third and fourth terminal pins and to disconnect said boost or voltage supply from said fourth pin terminal.

Said first signal line pin may be connected or connectable to a controller or microprocessor via a low side driver interface arrangement, adapted to determine the resistivity or relative resistivity of said sensor resistor.

A first terminal pin being connected to one terminal of said PM sensor resistor means it is the output sensing side terminal.

BRIEF DESCRIPTION OF THE DRAWINGS

The present invention is now described by way of example with reference to the accompanying drawings in which:

FIG. 2*a* shows the circuitry of FIG. 1 in more detail;

FIG. 2*b* shows a simplified view of FIG. 2*a*;

FIG. 5a shows a flowchart of operation according to one example;

FIG. 5b shows a table of the states of the function of PM sense RTD and heater in the PM sensing and regeneration modes of the arrangement of FIGS. 4a and 4b; and FIG. 6 shows the Function Enable Sequence i.e. the signal/voltage current levels or states going from the PM sensing mode to regeneration mode and back again for a number of input and output parameters listed on the left had side of the figure.

DESCRIPTION OF THE PREFERRED EMBODIMENTS

Prior Art

Figure 1:
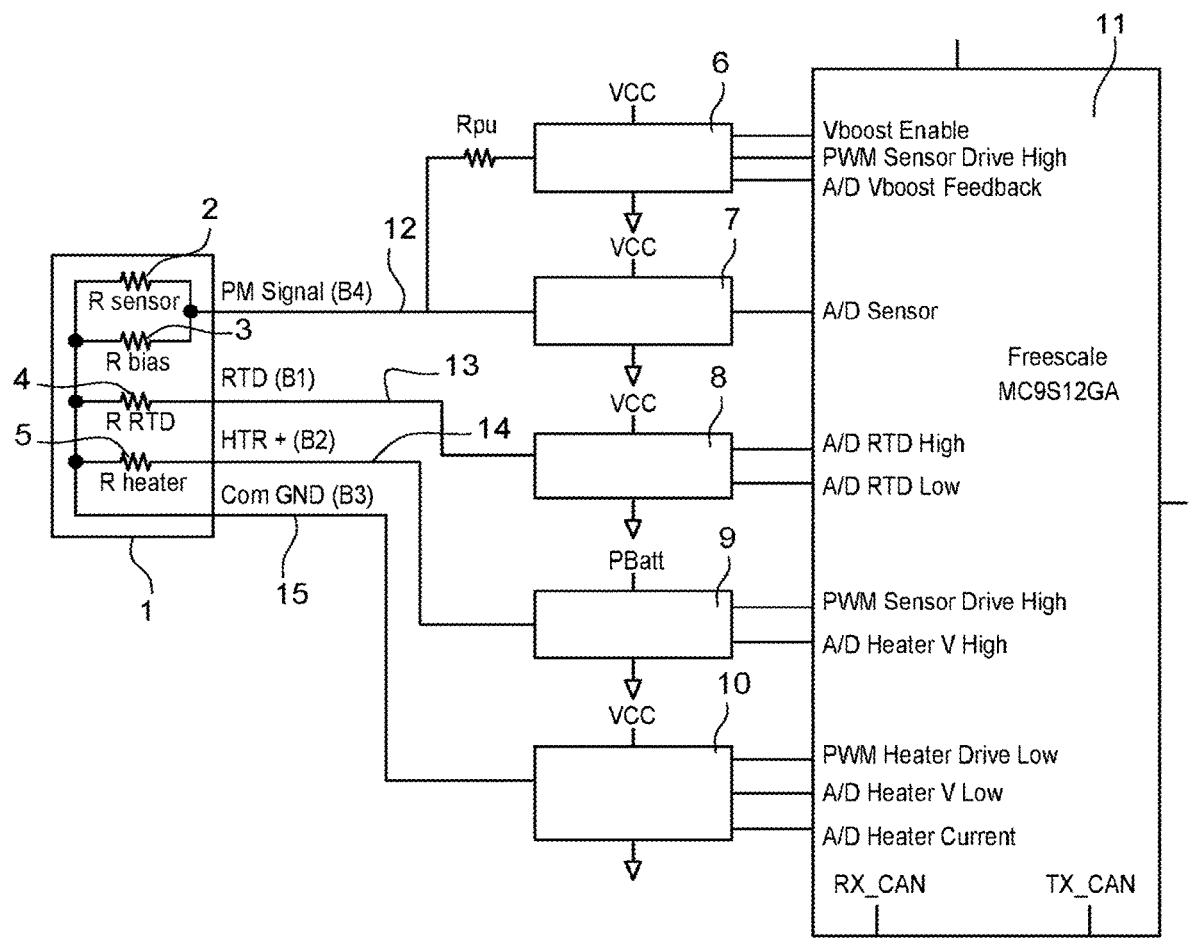
FIG. 1 shows a known PM sensor and associated circuitry.

A known PM sensor and associated circuitry (thus the interface with a PM controller) is shown in FIG. 1. A PM sensor 1 includes the sensor resistor 2, (Rsensor), typically with a bias resistor 3 (R bias) in parallel therewith, and this gives a PM sensor signal (B4) out via one terminal 12 of the sensor to be input into a microprocessor/controller via unit 7.

Conventionally the PM sensor is pulled up via terminal 12 by a boost voltage (e.g. 35V) for soot accumulation and resistive measurement. The terminal 12 is thus connected to a Vboost/sensor supply unit 6 which is in turn connected to a microprocessor 11 used to control operation of the sensor 2. In addition the terminal 12 is connected to a sensor signal buffer unit 7 to process the signal from terminal 12 for a input to the microprocessor (for sensor resistor measurement purposes).

The sensor also includes a RTD resistor 4 (R RTD)_which is connected via a RTD circuit 8 to the microprocessor from terminal 13. The RTD is a Resistive Temperature Device that integrated into sensor for sensor temperature measurement for improved PM sensing.

In addition, a heater resistance (R-heater) 5 is connected from terminal 14 to a heater high side driver 9 which is connected to battery for power and receives control signal from the microprocessor. Thus this is the heater high side connection, the driver has a PWM controlled output for sensor regeneration HTR+.

All the resistors of PM sensor are connected on one side (the opposite terminals to the outputs 12,13 and 14) to via terminal (pin) 15 to an intermediate unit 10 between the sensor and the controller/microprocessor. Unit 10 may an appropriate current (sense/heater) low side driver unit, connected to terminal 15 which is the "Com GND Ground" pin of the sensor; unit 10 has an input from the microprocessor for appropriate control.

FIG. 2a shows the circuitry of FIG. 1 in more detail. As can be seen there is a High Side Pull Up arrangement with Divider (High Side Divider interface) connected to terminal 12, generally designated 16, and includes many high impedance resistors (R1-R6) in the measurement circuitry, The High Side pull up arrangement is connected to a high voltage (e.g. 35V (boost) supply, and the microprocessor/controller.

FIG. 2b shows a simplified view of FIG. 2a to show current flow from the High Side Pull up arrangement through the sensor resistor 2 to the Low Side Driver 10, when the LSD is nominally "ON" (shown in the figure a switch X).

The problems with such circuitry is that there is a high impedance measurement accuracy issue caused by solder flux residue and the multiplicity of resistors R1 to R6. In order to measure PM sensor resistance range from 1 M-13 MΩ, multiple high impedance resistors are used to form the interface circuitry. In ideal case, this circuitry should work for the required resistance range (1 M-13 MΩ). In reality, the present of solder flux on the SMD process has great influence to the high impedance circuitry especially when operate in high ambient temperature (85-125° C.), the solder flux resistance will be greatly reduced and cause the measurement error >15% (design requirement).

Figure 3:
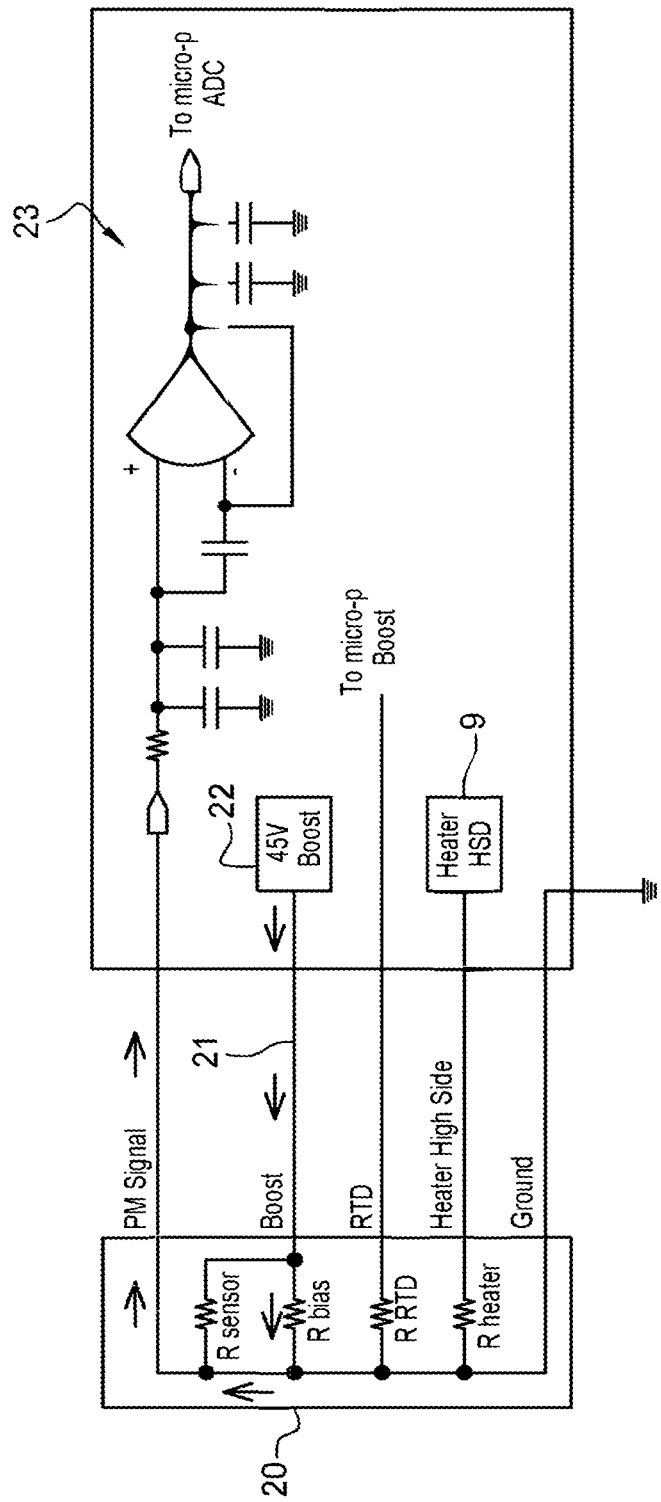
FIG. 3 shows an alternative prior art PM sensor and arrangement.

An alternative known arrangement is shown in FIG. 3. The sensor 20 has 5 pins. The extra pin in the sensor is called as 'Boost' pin 21. This boost pin provides high voltage (45V) pull up 22 to the PM sensor for soot accumulation and measurement. Thus this design use dedicated boost pin as direct pull up to the PM sensor. In this case, there is no need to have many high impedance resistors in the measurement circuitry between the sensor and the microprocessor, designated generally by reference numeral 23. Thus the measurement error caused by solder flux is insignificant. However, the drawback in this design is that an xtra pin in this PM sensor design is required.

Figure 4A:
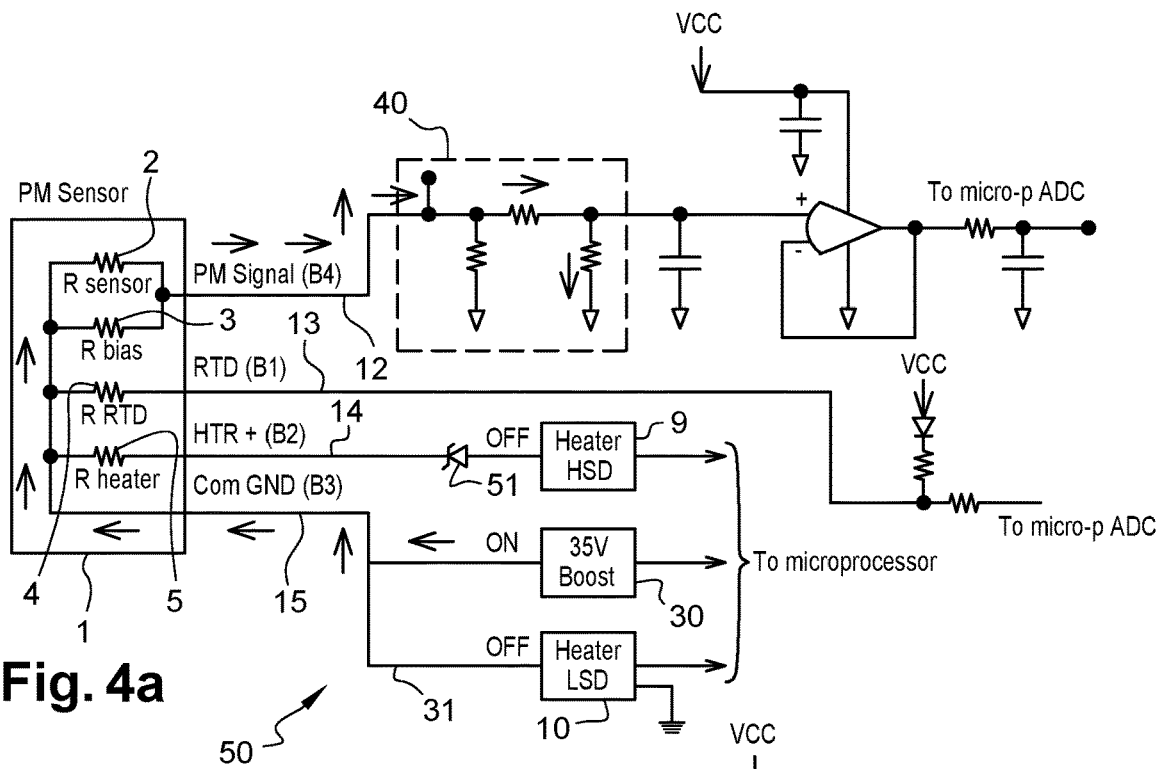
FIG. 4*a* shows an embodiment of the invention including a known 4 pin sensor with novel circuitry; operating in PM sensing mode.

FIG. 4a shows an embodiment of the invention and shows novel circuitry associated with the 4-pin sensor of FIG. 1. The figure shows novel circuitry connected between the sensor and the controller/microprocessor generally designated with reference numeral 50. Similar components have the same reference numerals as FIG. 1.

Here a boost input (from a boost voltage supply—e.g. 35V) designated with reference numeral 30, is selectable to be operationally connected to the ground pin 15 of the sensor rather being connected to pin 12. Thus the high side (boost) voltage is applied to the opposite terminal of the resistor sensor 2, to the output pin 12.

As a result, further instead of using a high side driver interface attached to pin 12, a simplified low driver interface 40 is used; this requires only a low resistance 100 k and 100 k resistor interface to improve the measurement accuracy.

Also connected to the (terminal) pin 15 is a low side line 31 which may include a low side drive 10. This low side drive can be regarded as the heater low side drive. This low side drive, like the 35V boost can be selectably operationally connected to pin 15.

Although not shown in the figure, heater HSD 9, boost voltage supply 30 and heater LSD 10 have connections to the microprocessor/controller for appropriate control therefrom.

The heater high side driver 9, the boost (e.g. 35V) supply 30 as well as the heater LSD 10 can thus all be enabled (ON) or disabled (OFF) by the microprocessor, such that they are either (operationally) connected to the pin 15 or not. The skilled person would be aware of appropriate switching means to manifest this.

So in other words the boost connection is made to the Com Ground pin for PM sensing. In operation when PM sensing, the RTD and heater (connections) are disabled as these functions are not required when PM sensing is active. In one example of operation, when the sensor resistance is less than a low set point (soot accumulated), the heater will be activated to burn the soot and PM sensing will be deactivated. So it may be regarded that the essence of the change is to connect the Boost (35V) to the Com GND pin.

Figure 4B:
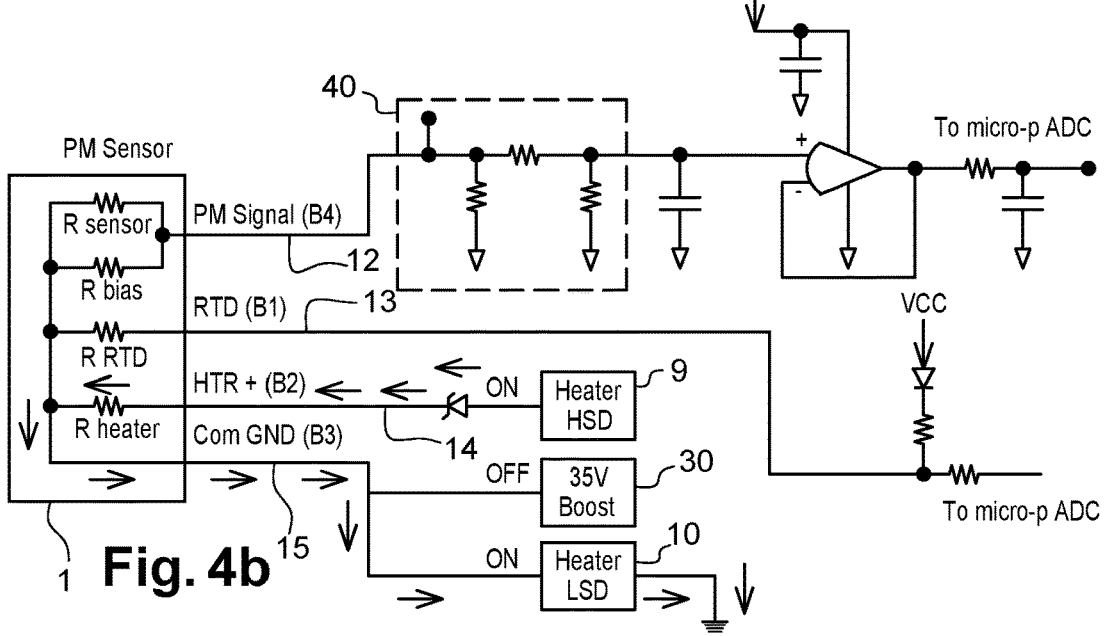
FIG. 4*b* shows the circuitry of FIG. 4*a* in regeneration mode.

The operation of the controller can be split into two modes: PM Sensing Mode (as per FIG. 4a) and Regeneration Mode (as per FIG. 4b). In FIG. 4a the heater HSD and Heater/LSD 10 are disabled (OFF) and the boost (voltage connection) is enabled. Current flows in the direction of the arrows through the sensor to the simplified LSD interface 40 from measurement by the microprocessor. In FIG. 4b shows the regeneration mode where the heater HSD and Heater LSD are enabled (ON) and the boost supply is disabled (OFF) to allow current to flow through the heater resistor to burn of soot as shown by the arrows—see also FIG. 5b which will be explained.

Figure 4C:
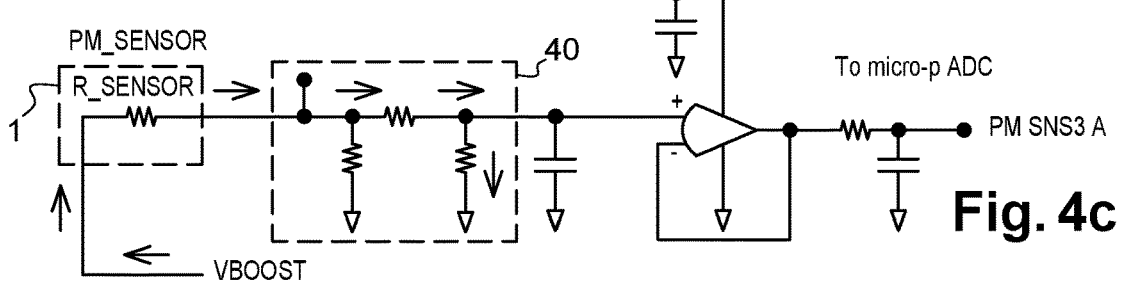
FIG. 4*c* shows simplified circuitry of FIG. 4*a* showing the salient components for the PM sensing mode.

FIG. 4c shows simplified circuitry of FIG. 4a showing the salient components for the PM sensing mode.

The interface circuitry thus uses can use a simple low side divider (which uses e.g 2×100 k resistors) and this leads to improve the measurement accuracy and overcoming the aforementioned problems. Boost connected to Com GND pin will be the pull up voltage for Sensor during the PM Sensing Mode.

A (e.g. Schottky) diode 51 is preferably added to the Heater HSD to block current flow back from 35V to 12V. This Schottky diode can also be replaced by discrete PFET circuit for lower forward voltage drop during heater operation if necessary.

Operation a) PM Sensing Mode:

In PM Sensing Mode, 35V boost will be activated. Heater HSD and Heater LSD will be deactivated. RTD and heater are disabled as these functions not required to operate in this mode. The controller will monitor the PM sensor resistance and activate the Regeneration Mode once the sensor resistance drop below the threshold set (<2 MΩ).

Regeneration Mode:

When the sensor resistance is <2 MΩ, controller will activate the Regeneration Mode. In this mode, 35V boost will be deactivated. Followed by the activation of Heater HSD and Heater LSD. Heater LSD will be turned ON permanently in this stage. Heater HSD will be switched in PWM mode (100 Hz and duty cycle defined by software). Activation of heater is to burn off the soot accumulated on the sensor. RTD function is enabled to monitor the heater/sensor temperature during the sensor regeneration. The controller will check PM sensor resistance (in PM Sensing Mode) after each period of heating cycle performed. Once the sensor is clean (resistance>13 MΩ), the controller will switch the operation back to PM Sensing Mode.

FIG. 5a shows a flowchart of operation for the arrangement of FIGS. 4a and 4b. In step S1 the system is in PM sensing mode. In step S2 it is determined if the PM sensor resistor reaches a resistance of less than a set value e.g. 2 MΩ. If so, the process proceeds to step S3 which is regeneration mode. In step 4 it is determined if the resistance of the PM senor reaches a higher preset value e.g. 13 MΩ. It should be noted that this step includes a sensing mode to determine this; this may be done at intervals to see how the regeneration mode is getting on. If so the process returns to PM sensing mode S1.

The table of FIG. 5b shows the states of the function of PM sense RTD and heater in the PM sensing and regeneration modes of the arrangement of FIGS. 4a and 4b.

FIG. 6 shows the Function Enable Sequence i.e. the signal/voltage current levels or states going from the PM sensing mode to regeneration mode and back again for a number of input and output parameters listed on the left had side of the figure.

Comparative Results

Table 1 below shows the reduction in high impedance resistor usage:

| Interface Resistor | Current Design | Invention |
|---|---|---|
| R1 | 1 MΩ | — |
| R2 | 1 MΩ | — |
| R3 | 1 MΩ | — |

-continued

| Interface Resistor | Current Design | Invention |
|---|---|---|
| R4 | 1 MΩ | 100 kΩ |
| R5 | 665 kΩ | 100 kΩ |
| R6 | 1 MΩ | — |

Table 2 below shows the measurement error Comparison (with solder flux resistance 100 MΩ/mm):

| R_Sensor | Current Design | Invention |
|---|---|---|
| 1 MΩ | 2.09% | 0.51% |
| 2.5 MΩ | 4.92% | 0.49% |
| 10 MΩ | 16.92% | 0.49% |
| 13 MΩ | 20.91% | 0.49% |
| 17 MΩ | 25.67% | 0.49% |

Cost Saving with invention are estimated to be USD$0.10 per controller and estimated solder flux cleaning avoidance saving: USD$3 per controller. The invention solves the problem of high impedance accuracy issue in the current PM controller design is solved with the new design. At the same time, the invention provides significant savings.

The invention claimed is:

1. A particulate matter (PM) sensor circuit arrangement comprising:
a PM sensor; said PM sensor including, integral therewith, a PM sensor resistor;
a resistive temperature device (RTD) resistor, and a heater resistor, said PM sensor also including four terminal pins, of which
a) a first terminal pin is connected to one terminal of said PM sensor resistor;
b) a second terminal pin is connected to one terminal of said RTD resistor;
c) a third terminal pin is connected to one terminal of a heater resistor; and
d) a fourth common terminal pin is connected to respective opposite terminals of said PM sensor resistor, said RTD resistor, and said heater resistor; and
a microprocessor connected to the PM sensor via intermediary circuitry, the intermediary circuitry including a boost voltage supply, a heater low side driver, and a heater high side driver;
wherein said fourth common terminal pin is selectively operationally connectable or connected to (i) the boost voltage supply in a PM Sensing mode in which the PM sensor resistance is monitored, or to (ii) the heater low side driver in a Regeneration mode for regeneration of the PM sensor resistor; and
wherein said first terminal pin is connected at a voltage which is lower than at said boost voltage supply.

2. A PM sensor circuit arrangement as claimed in claim 1, wherein the heater high side driver is connected between the third terminal and the microprocessor.

3. A PM sensor circuit arrangement as claimed in claim 1, further including a diode connected between the heater high side driver and the third terminal.

4. A PM sensor circuit arrangement as claimed in claim 1, wherein the boost voltage supply and the heater low side driver are connected between the third terminal and the microprocessor.

5. A PM sensor circuit arrangement as claimed in claim 1, further comprising a diode located between said third terminal pin and the heater low side driver or a heater high side driver/line.

6. A PM sensor circuit arrangement as claimed in claim 1, wherein said PM sensor circuit arrangement is selectable in the PM Sensing mode to operationally connect said boost supply to said fourth terminal pin which allows current to flow from said boost supply via said fourth terminal pin through said PM Sensor resistor to said first terminal pin, and to operationally disconnect said heater low side driver or the heater high side driver from said fourth terminal pin so as to prevent current flowing through said heater resistor.

7. A PM sensor circuit arrangement as claimed in claim 6, wherein said PM sensor circuit arrangement is selectable in the Regeneration mode which allows current to flow through said heater resistor via said third terminal pin and said fourth terminal pin and which disconnects said boost or voltage supply from said fourth terminal pin.

8. A PM sensor circuit arrangement as claimed in claim 1, wherein said first terminal pin is connected or connectable to a controller or the microprocessor via the heater low side driver which is configured to determine resistivity or relative resistivity of said sensor resistor.

9. A PM sensor circuit arrangement as claimed in claim 4, wherein the boost voltage supply and heater low side driver are connected in parallel.

10. A particulate matter (PM) sensor circuit arrangement comprising:
a PM sensor; said PM sensor including, integral therewith, a PM sensor resistor; a resistive temperature device (RTD) resistor, and a heater resistor, said PM sensor also including four terminal pins, of which
a) a first terminal pin is connected to one terminal of said PM sensor resistor;
b) a second terminal pin is connected to one terminal of said RTD resistor;
c) a third terminal pin is connected to one terminal of a heater resistor; and
d) a fourth common terminal pin is connected to respective opposite terminals of
said PM sensor resistor, said RTD resistor, and said heater resistor;
a microprocessor connected to the PM sensor via intermediary circuitry, the intermediary circuitry including
a boost voltage supply connected between the microprocessor and the fourth common terminal pin,
a heater low side driver connected between the microprocessor and the fourth common terminal pin, and
a heater high side driver connected between the microprocessor and the third terminal pin, wherein the boost voltage supply and the heater low side driver are connected in parallel;
wherein said fourth common terminal pin is selectively operationally connectable or connected to (i) the boost voltage supply in a PM Sensing mode in which the PM sensor resistance is monitored, or to (ii) the heater low side driver in a Regeneration mode for regeneration of the PM sensor resistor; and
wherein said first terminal pin is connected at a voltage which is lower than at said boost voltage supply.

* * * * *